United States Patent Office 3,676,051
Patented July 11, 1972

3,676,051
PROCESS FOR DYEING AND PRINTING TEXTILE MATERIALS MADE FROM SYNTHETIC ORGANIC FIBRES
Purushottam Janardan Kangle, Goregaon-Bombay, India, and Visvanathan Ramanathan, Basel, and Rudolf Argy, Arlesheim, Switzerland, assignors to Ciba-Geigy AG, Basel, Switzerland
No Drawing. Filed June 15, 1970, Ser. No. 46,452
Claims priority, application Switzerland, June 16, 1969, 9,158/69
Int. Cl. D06p 5/00
U.S. Cl. 8—65
6 Claims

ABSTRACT OF THE DISCLOSURE

A process for dyeing and printing textile materials comprising one or more synthetic, hydrophobic linear polymers that are free from nitrile groups, wherein the material is padded with a disperse dyestuff which contains amino groups but which does not contain acidic groups or quaternary ammonium groups, dried, printed with a printing paste containing a compound having an acid reaction at least when subjected to heat, the material is subjected to fixation by the application of dry heat and subsequently the salt of the dyestuff containing amino groups is washed out of the printed areas.

---

The present invention relates to a process for the dyeing and multi-colour printing of textile materials made from hydrophobic, synthetic organic fibres.

The present invention provides a process for dyeing and printing textile materials comprising one or more synthetic, hydrophobic linear polymers that are free from nitrile groups, wherein the material is padded with a disperse dyestuff which contains amino groups but which does not contain acidic groups or quaternary ammonium groups, dried, printed with a printing paste containing a compound having an acid reaction at least when subjected to heat, the material is subjected to fixation by the application of dry heat and subsequently the salt of the dyestuff containing amino groups is washed out of the printed areas.

The following may be mentioned as examples of hydrophobic synthetic fibres that can be dyed and printed in accordance with the process of the invention: polyurethane fibre; fibres based on a polyepoxide; polyamide fibres, for example, nylon 6, nylon 6.6, nylon 11 or nylon 12; polyolefin fibres, for example, polypropylene fibres, and especially fibres made from cellulose triacetate or from aromatic polyesters, for example, fibres made from terephthalic acid and ethylene glycol or 1,4-dimethylolcyclohexane, fibres made from copolymers of terephthalic and isophthalic acids and ethylene glycol, and fibres made from cellulose triacetate and secondary acetate.

The process can also be used for dyeing and printing fabrics made from blends of the above-mentioned fibres and hydrophilic fibres, especially cellulosic fibres and wool. Examples are polyester/nylon mixtures, polyester/cotton mixtures and polyester/wool mixtures.

The textile materials are generally woven or knitted fabrics or other flat-surface materials.

The dyestuffs used are basic disperse dyestuffs, the term "disperse dyestuffs" as used herein having the definition given in the Colour Index. The dyestuffs must not contain sulphonic acid or carboxyl groups. The padding liquor can also contain disperse dyestuffs which are free from amino groups, in addition to the disperse dyestuffs containing amino groups, when special resist effects are desired.

The basic disperse dyestuffs used in the process of the invention are free from acidic groups and quaternary nitrogen atoms. They contain only primary, secondary and tertiary amino groups, which groups may be bound cyclically, that form stable salts with strong acids, especially inorganic acids.

The dyestuffs which may be used belong, for example, to the following classes: monoazo, disazo and polyazo dyestuffs, anthraquinone, perinone, quinophthalone, nitroso, stilbene and methine dyestuffs, including the styryl, azamethine, polymethine and azostyryl dyestuffs. However, other suitable types of dyestuff can also be used.

The following are given as examples of the dyestuffs which may be used according to the process of the present invention:

(1) Azo dyestuffs

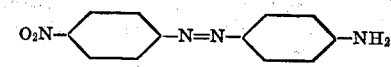

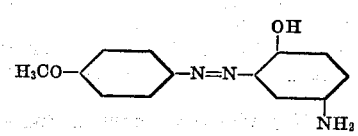

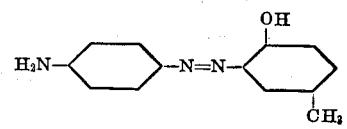

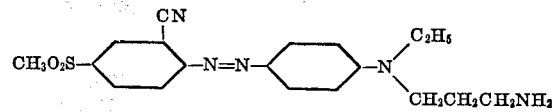

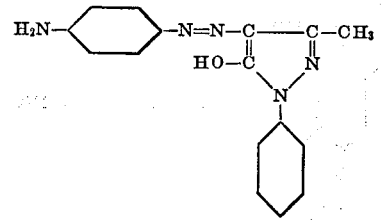

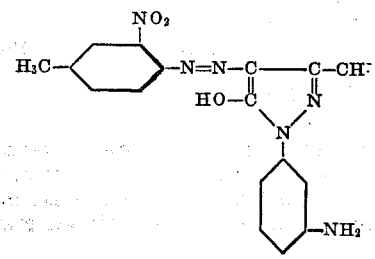

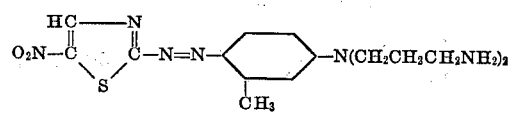

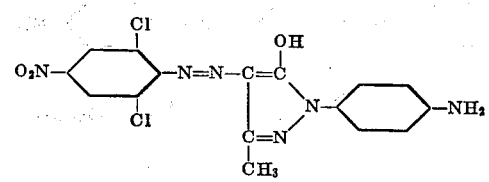

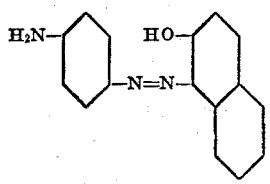

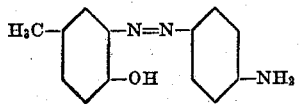

2-methyl-4-[N-ethyl-N-(diethylaminoethyl)-amino]-2′,4′-dicyano-1,1′,azobenzene,
2-methyl-4-[N-(β-dimethylaminoethyl)-amino]-2′,4′-dicyano-1,1′-azobenzene,
2-methyl-4-[N-ethyl-N-(β-dimethylaminoethyl)amino]-2′,5′-dicyano-4′-nitro-1,1′-azobenzene,
2-methyl-4-[N-(β-hydroxyethyl)-N-(β-dimethylaminoethyl)-amino]-2′-cyano-5′-chloro-1,1′-azobenzene,
2-methyl-4-[N-(β-dimethylaminoethyl)-amino]-4′-nitro-1,1′-azobenzene,
2-methyl-4-[N-(β-hydroxyethyl)-N-(β-dimethylaminoethyl)-amino]-4′-nitro-1,1′-azobenzene,
2-methyl-4-[N-ethyl-N-(β,N′-ethyl-N′-amidoacetylaminoethyl)-amino]-3′-chloro-4′-nitro-1,1′-azobenzene,
4-[N-methyl-N-(N′-methylaminoethyl)-amino]-3-chloro-4-nitro-1,1′-azobenzene.

(2) Anthraquinone dyestuffs 1,4-bis-(para-aminoanilino)-5-hydroxyanthraquinone,
1,4-bis-(para-aminoanilino)-5,8-dihydroxyanthraquinone,
1,4-bis-(para-aminoanilino)-2-methylanthraquinone,
1,5-bis-(para-aminoanilino)-4,8-dihydroxyanthraquinone,
1-hydroxy-4-(para-aminoanilino)-anthraquinone,
1-amino-2-bromo-4(3′-dimethylaminopropylamino)-anthraquinone,

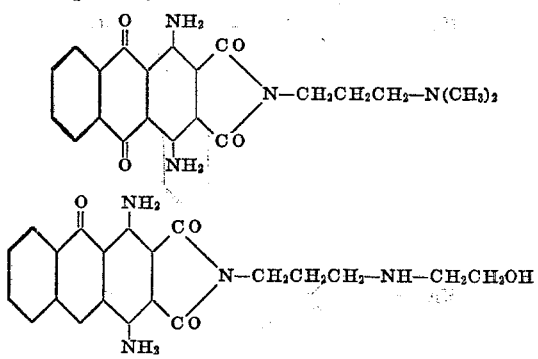

Amino groups at the α-position on the anthraquinone nucleus do not constitute basic amino groups in so far as this invention is concerned, because they are inactivated by the formation of intramolecular hydrogen bridges.

(3) Nitro dyestuffs

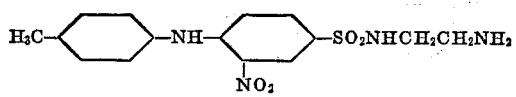

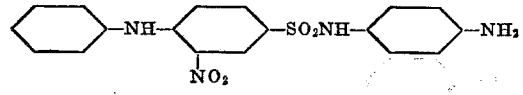

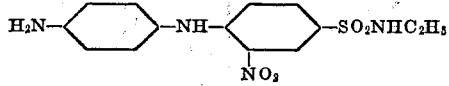

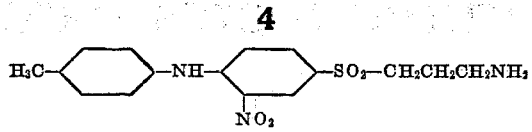

(4) Styryl dyestuffs

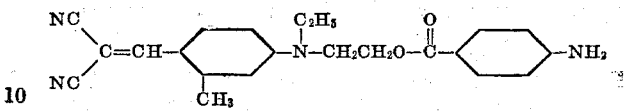

(5) Quinophthalone dyestuffs

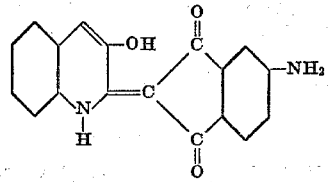

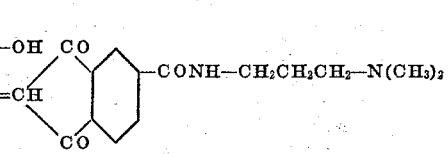

(6) Perinone dyestuffs

Mixtures of dyestuffs corresponding to the formula

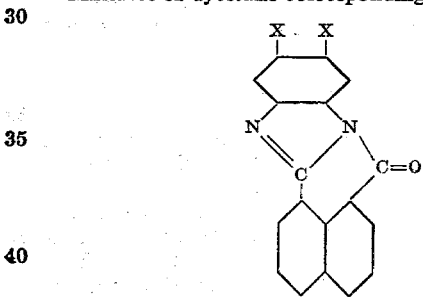

or mixtures of dyestuffs corresponding to the formula

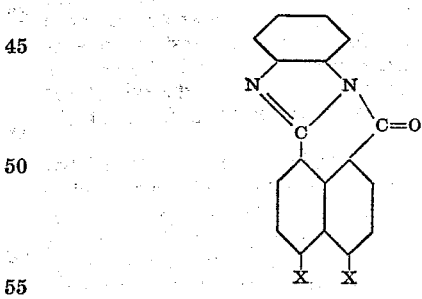

in which formulae one of the symbols X represents a group of the formula —NH₂ and the other symbol X represents a hydrogen atom.

(7) Various bis-(4-amino-meta-tolyl)-(ortho-chlorophenyl)-methanecarbinol, the carbinol form of Rhodamine B (Colour Index No. 45,170 BZ) of the formula

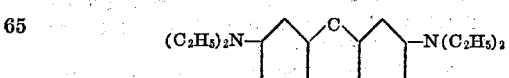

and Victoria Green (C.I. 42,000, carbinol form).

Also suitable are the alkylation products, especially the N-methyl and N,N-dimethyl derivatives, of the above-mentioned dyestuffs having a free $NH_2$ group.

Dyestuffs that may also be mentioned are those obtained by the addition of vinylpyridine, for example, the monoazo dyestuff obtained from the diazonium compound of 2-chloro-4-nitroaniline and N-ethyl-N-[β-(pyridyl-4')- ethyl]-aminobenzene; the monoazo dyestuff obtained from the diazonium compound of 2,4-dinitro-6-bromobenzene and 1-[β-(pyridyl-4')-ethyl]-aminonaphthalene; the monoazo dyestuff obtained from the diazonium compound of 2-chloro - 4-nitroaniline and N-ethyl-N-[β-(nicotinyloxy-ethyl)]-aminobenzene. There may also be mentioned the dyestuffs of the formulae

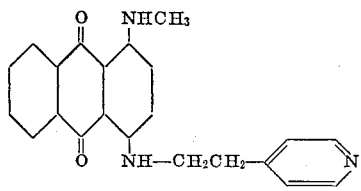

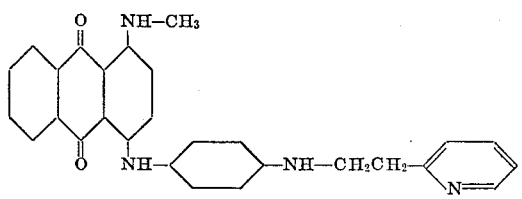

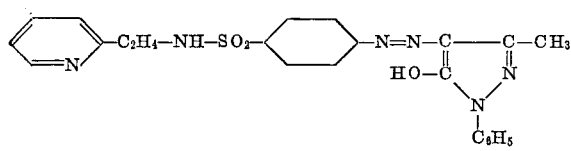

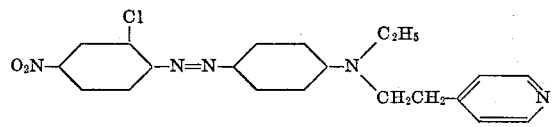

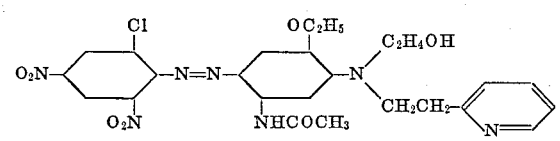

as well as the following dyestuffs:

1,4-diamino-2,β-(pyridyl-2')-ethoxyanthraquinone,
1,4-diamino-5γ-picolylaminoanthraquinone,
1,4-diamino-5-[β-(γ-aminopropylamino)ethoxy]-anthraquinone,
1,4-diamino-2-β-dimethylaminoethoxyanthraquinone,
1,4-diamino-5-γ(β-hydroxyethylamino)-propylamino-anthraquinone,
N-ethyl-N,β-pyrazolyl-(1)-ethyl-4-(2-chloro-4-nitrophenylazo)-aniline and
N-ethyl-N,β-(3',5'-dimethylpyrazolyl-1')-ethyl-3-acetylamino-4-(2-chloro-4-nitrophenylazo)-aniline.

Padding is generally carried out with an aqueous liquor. In addition to the dyestuff, the padding liquor may, if necessary, contain one or more auxiliaries, for example, sodium salts of highly condensed naphthalenesulphonic acid/formaldehyde resins, sulphite cellulose waste liquor products, condensation products of higher alcohols and ethylene oxide, polyglycol ethers of fatty acid amides and alkylphenols, sulphosuccinic acid esters or Turkey red oil. However, the padding liquor may also comprise a solution of the dyestuff in one or more organic solvents. After squeezing to a weight increase of 20 to 200%, referred to the dry weight of the fibre, the textile material is dried. Drying can be carried out, for example, with steam or preferably with a current of hot air at a temperature between 70 and 150° C. over a period of 10 to 300 seconds.

The fabric is then printed with a printing paste containing a compound that has an acidic reaction at least when subjected to heat, for example, a heat-resistant organic or inorganic acid (for example, citric acid, phosphoric acid or monosodium phosphate) or, preferably, a compound that liberates a strong inorganic acid when subjected to heat (for example, the ammonium salt of a strong acid). The amount of acid must be such that the dyestuff present on the fibre is certain to be converted into a salt. If the resist is to remain white, the resist paste may contain a white pigment, for example, titanium dioxide or zinc oxide. The printing paste may also contain the usual additives, for example, a thickener, for example, gum arabic or methyl cellulose.

To produce multi-coloured prints, dyestuffs that are stable towards acids, especially disperse dyestuffs, are added to the printing paste. These dyestuffs must not contain basic amino groups or acidic groups. The disperse dyestuffs free from amino groups and acidic groups as listed in the Colour Index may be used.

Furthermore, one or more fluorescent brightening agents that hvae an affinity for the organic fabric (for example, nylon and especially cellulose acetate and polyester fabrics) may be incorporated into the acidic printing paste. In addition to a disperse dyestuff free from amino groups, the printing paste may also contain dyestuffs of other categories. After printing, the textile material can be dried either with steam or hot air, or it can be subjected to the fixation process as it is.

Fixation of the dyestuff or dyestuffs on the textile material may be carried out at 120 to 260° C., preferably 150 to 230° C., depending on the nature of the fibre, by steaming or preferably by means of dry heat (Thermosol process) in a suitable apparatus. It is also possible to use superheated steam at a temperature of 110 to 200° C.

After fixation, the printed material is washed out in an aqueous liquor. The usual tensides may be used in this process, for example, those mentioned above.

The following examples illustrate the invention, the parts and percentages being by weight, unless otherwise stated.

EXAMPLE 1

A polyester fabric is padded with an aqueous liquor containing 0.8% of the dyestuff of the formula

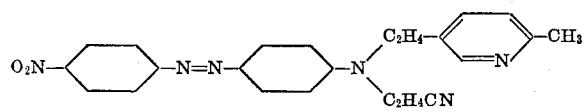

squeezed to a liquor pick-up of 60%, dried for 1 minute at 120° C., printed with a solution of 40 grams of ammonium sulphate, 40 grams of citric acid, 20 grams of dodecylbenzenesulphonate paste (75%), 690 grams of carboxylmethyl starch solution (10%) and 210 grams of water, dried for 1 minute at 120° C. and then thermofixation is carried out in hot air for 1 minute at 200° C. The fabric is then boiled for 30 to 60 seconds in a solution of 15 g./l. of sodium hydroxide solution (60° Bé.), 5 g./l. of sodium dithionite, 5 g./l. of sodium hydrosulphite and 5 g./l. of an addition product of 4 mols of ethylene oxide and sodium 1-methyl-2-heptadecyl-2-heptadecylbenzimidazole sulphonate, rinsed cold and dried. A scarlet fabric with a white resist design is obtained.

EXAMPLE 2

Dyeing is carried out in the same manner as in Example 1, but using the dyestuff of the formula

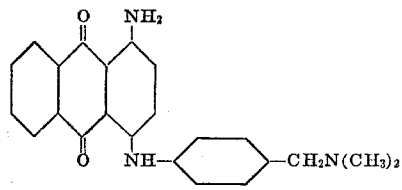

A blue fabric with a white resist effect is obtained.

The same result is obtained when the printing paste additionally contains 10 g./l. of sulphamic acid.

EXAMPLE 3

A polyester fabric is padded with an aqueous liquor containing 1.2% of the dyestuff of the formula

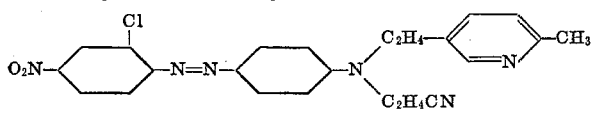

squeezed to a liquor pick-up of 60%, dried for 1 minute at 120° C., printed with an aqueous solution of 40 g./kg. of ammonium sulphate, 690 g./kg. of carboxy-methyl starch solution (10%), dried for 1 minute at 100° C. and then thermofixation is carried out in hot air for 1 minute at 200° C. The fabric is then washed for 10 minutes at 80 C. in a solution of 3 g./l. of sodium hydroxide solution (36° Bé.), 2 g./l. of sodium hydrosulphite and 1 g./l. of an addition product of 4 mols of ethylene oxide and sodium 1-methyl-2 - heptadecylbenzimidazolesulphonate, rinsed cold and dried. A scarlet fabric having a white resist design is obtained.

A scarlet pattern is obtained in exactly the same manner when a triacetate fabric is used instead of a polyester fabric.

Patterns with a white resist can be obtained in an analogous manner on polyester and triacetate fabrics when the following dyestuffs are used:

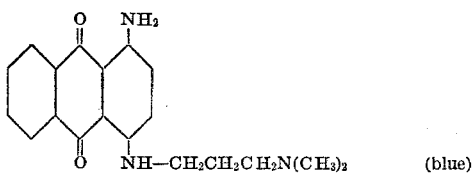
(blue)

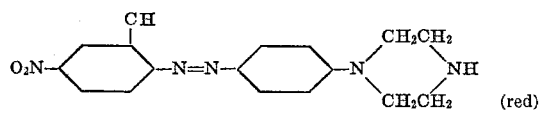
(red)

A coloured resist can be obtained when one of the following dyestuffs is present in the resist paste:

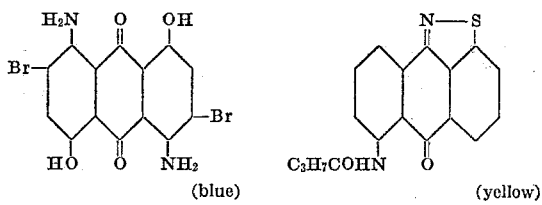
(blue)                                    (yellow)

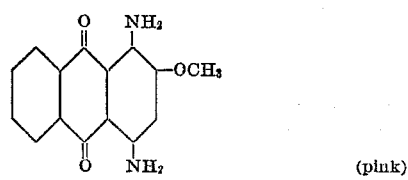
(pink)

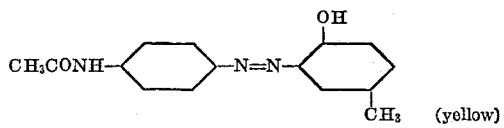
(yellow)

and

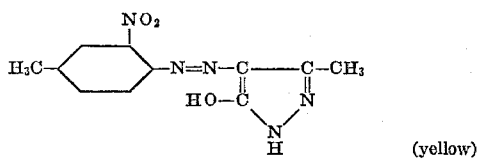
(yellow)

We claim:
1. A process for dyeing or printing polyester, nylon, polypropylene or cellulose triacetate textiles which comprises
   (a) dyeing said textile with a basic disperse dyestuff containing amino groups capable of forming stable salts with acid, said dyestuff being free of sulphonic acid and carboxylic acid groups and free of quaternary nitrogen atoms, said dyestuff additionally being characterized by the inability of the acid salt thereof to dye said textile,
   (b) thereafter printing the dyed textile with a printing paste containing a stoichiometric excess of an acid reacting material selected from citric acid, phosphoric acid, sulphamic acid, monosodium phosphate, aluminum sulphate, ammonium sulphate, and mixtures thereof,
   (c) drying the printing paste and thereafter heating the textile at 120° to 260° C. under substantially anhydrous conditions to fix the unreacted dye and
   (d) washing the textile to remove the salt.
2. A process as claimed in claim 1, wherein the acid reaction material present in the printing paste is aluminium sulphate or ammonium sulphate.
3. A process as calimed in claim 1, wherein the printing paste also contains a fluorescent brightening agent that is free from basic amino groups.
4. A process as claimed in claim 1, wherein the printing paste also contains a white pigment.
5. A process as claimed in claim 1, wherein the printing paste also contains a disperse dyestuff that is free from basic amino groups.
6. A process as claimed in claim 1, wherein the textile material is an aromatic polyester or cellulose triacetate.

References Cited

UNITED STATES PATENTS

| | | | |
|---|---|---|---|
| 2,022,413 | 11/1935 | Ellis et al. | 8—5 |
| 1,838,567 | 12/1931 | Morton et al. | 8—65 |
| 1,080,433 | 12/1913 | Freiberger | 8—69 |
| 1,864,007 | 6/1932 | Weidenberg | 8—69 |
| 2,005,182 | 6/1935 | Ellis et al. | 8—69 |

FOREIGN PATENTS

| | | | |
|---|---|---|---|
| 1,005 | 1852 | Great Britain | 8—69 |

OTHER REFERENCES

Am. Dyestuff Rep. "Some Observations on Textile Printing" by Habel, Apr. 28, 1952, pp. 269–270.

Application of Dyestuffs by Matthews, p. 285, 1920, Wiley & Sons, Inc., New York.

GEORGE F. LESMES, Primary Examiner

J. C. COOPER III, Assistant Examiner

U.S. Cl. X.R.

8— 21, 22, 69, 177 AB